April 23, 1940.　　O. S. PETERS　　2,198,040
RECORDER APPARATUS
Filed July 27, 1935
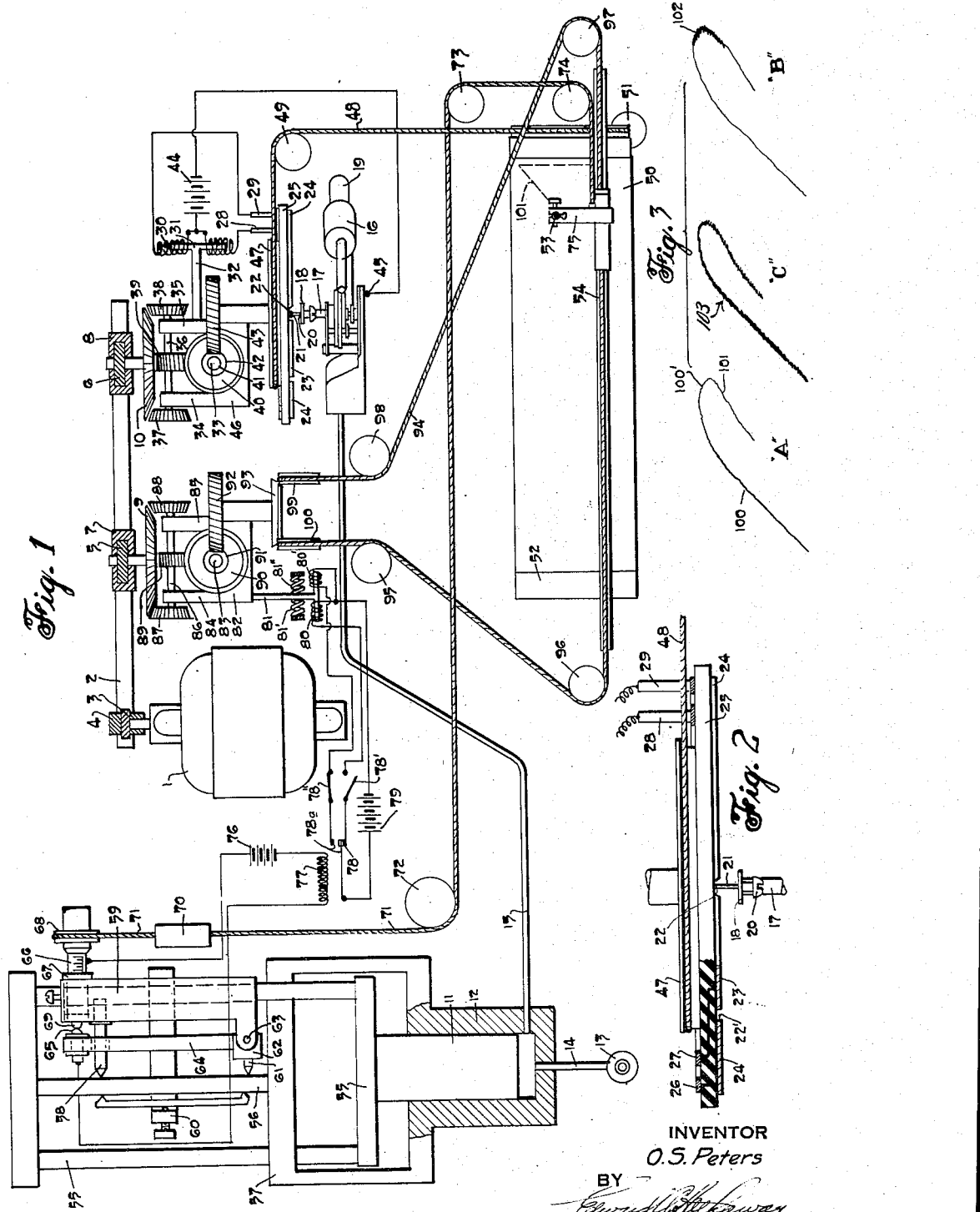
INVENTOR
O. S. Peters
BY
ATTORNEY Patented Apr. 23, 1940

2,198,040

UNITED STATES PATENT OFFICE 2,198,040

RECORDER APPARATUS

Orville S. Peters, Chevy Chase, Md., assignor, by mesne assignments, to The Baldwin Locomotive Works, a corporation of Pennsylvania Application July 27, 1935, Serial No. 33,469

6 Claims. (Cl. 265—2)

This invention relates to a recorder for graphically recording the relation of stress and strain of a specimen under test in a materials testing machine and relates more particularly to improved means for recording strain of a specimen during either loading or unloading thereof.

It has heretofore been proposed to record strain during loading and unloading of a specimen, but this has been accomplished by mechanism whose characteristics during loading are adapted for indicating both increases and decreases in strain and similarly during unloading the characteristics are adapted to be responsive to both increases and decreases in strain. As a result, the graphic representation on the recorder chart is in the nature of a relatively wide line or band. Such a wide band is sometimes difficult of accurate interpretation of the stress or strain characteristics of the specimen. Other devices have heretofore been proposed such as shown in the joint invention of myself and G. S. von Heydekampf, Patent No. 2,081,598, wherein during increases of strain the graphic representation thereof is a very narrow line or band, thus permitting a very accurate interpretation of the stress and strain characteristics of the specimen. This arrangement, however, is limited merely to recording increases in strain.

It is an object of my invention to provide an improved means whereby a relatively narrow line records the stress and strain during increases or decreases thereof such as is usually brought about by loading and unloading of the specimen. Such loading and unloading operation is usually employed in making a hysteresis test. It is a further object of my invention to accomplish the foregoing result without having the mechanism encumber the record during the increase of strain with mechanical characteristics that are preferably useful only with decrease of strain, or vice versa. A still further object is to provide improved means whereby at very critical points in the stress-strain relation, where it may be difficult to determine whether the strain is increasing or decreasing, the operator may simultaneously employ both the strain increasing and decreasing responsive characteristics of the mechanism, but that after such a critical point has been passed he may eliminate one or the other of the characteristics of the mechanism so that a relatively fine record line may be obtained.

Other objects and advantages will be more apparent to those skilled in the art from the following description of the accompanying drawing in which:

Fig. 1 is a diagrammatic plan view of the apparatus showing the parts in their cooperative relation;

Fig. 2 is an enlarged plan view of an electrical follow-up device part of which is broken away to show the details of construction.

Fig. 3 illustrates three forms of curves obtainable with my improved apparatus.

In the particular embodiment of the invention which is shown herein merely for the purpose of illustrating one specific form among possible others that the invention might take in practice, I have shown the invention as applied to a materials testing machine of the hydraulic type. Such a machine is merely a diagrammatic representation of one of the various types of materials testing machines with which my invention may be employed as will be apparent to those skilled in the art.

Referring to the drawing in detail, an electric motor 1 drives a shaft 2 through reducing gears 3 and 4. On the shaft 2 are secured worms 7 and 8 for operating worm gears 5 and 6, to the shafts of which are secured bevel gears 9 and 10. Thus with the motor 1 continuously in operation, bevel gears 9 and 10 are continuously in rotation, the object being to supply power to the recording devices when required.

One form of materials testing machine, to be described more fully hereinafter, is diagrammatically shown as having a piston 11 arranged to slide in a hydraulic chamber 12 within which the pressure may be varied by means of a pump 13, fluid therefrom being supplied to chamber 12 through the pipe 14. From the chamber 12 a tube 15 leads to a pressure gage mechanism 16 of the Bourdon tube type, whose shaft 17 has a hand 18 which rotates as the pressure within the Bourdon tube 19 changes. The hand 18 carries at its outer end a screw 20 with a metal whisker 21 affixed thereto.

The whisker 21 in its normal position rests without touching within a gap 22 in a segmental metal ring consisting of two segments 23 and 24 separated by gaps 22 and 22′, but is so constructed that in the event of a sudden movement of the hand 18 it can ride up on either segment 23 or 24. The segments 23 and 24 are secured to and are coaxial with a disk of insulating material 25, and are also coaxial with the axis of rotation of hand 18 so that whisker 21 is in contact with either segment 23 or 24 at all parts of its travel except while in the gap 22 or in the corresponding gap at the opposite end of segment 24. Disk 25 carries on its back two continuous metal rings 26 and 27, arranged concentrically and secured to the disk 25 so as to rotate with it. Ring 26 is connected electrically to segment 24, and ring 27 to segment 23. In contact with the rings 26 and 27 are two metallic brushes 28 and 29 which lead to the coils of a double acting solenoid 30. The armature 31 of the solenoid is secured to a lever 32 secured to a yoke 46 for oscillating the same about a center 33. Yoke 46 carries in bearings 34 and 35 a shaft 36 upon which are mounted bevel gears 37 and 38 adapted when alternatively engaged with the bevel gear 10 to be rotated thereby in one direction or the other, depending upon which gear is engaged.

Mounted upon shaft 36 is spiral gear 39 engaging a spiral gear 40 whose shaft 41 has a worm 42 meshing with a worm wheel 43, which in turn is secured upon the shaft of the disk 25 and rotates therewith.

The operation of this portion of the apparatus which records the load or stress coordinate, represented by the pressure, is as follows: A pressure change in the chamber 12 is accompanied by a rotation of the hand 18 which brings the whisker 21 in electrical contact with either segment 23 or 24, depending upon whether the pressure change is an increase or a decrease. This operation energizes the corresponding side of solenoid 30 through the medium of the battery 44 which is connected to the mid-point of the solenoid winding and to the frame of the pressure gage 16 at 45. When one side of the solenoid 30 is energized, the armature is drawn in, and through lever 32 and yoke 46, which rotates about center 33, bevel gear 37 is engaged with bevel gear 10. The rotation of bevel gear 10 is thereby transmitted through the medium of spiral gears 39 and 40, worm 42 and worm gear 43 to the disk 25, which thereby tends to rotate in the same direction as hand 18 and break the contact between the whisker 21 and segment 23 or 24. This break in contact releases solenoid 30 and causes bevel gear 10 to become disengaged. As the pressure in chamber 12 increases or decreases, the hand 18 and disk 25 will rotate together with a degree of hunting which may be controlled by the width of the gap 22.

On increasing pressure, the hand 18 is preferably made to rotate in a counter-clockwise direction, or towards segment 23, which is made less than one-fourth of the total circumference of rotation of hand 18. Segment 24 is correspondingly made greater than three-fourths of the circumference. The reason for this is that, as commonly, constructed, Bourdon tube type pressure gages show a rotation of three-fourths of a complete circle on full pressure. Thus if hand 18 is rotated to three-fourths of a circle and the pressure is suddenly released, the return rotation does not carry whisker 21 beyond segment 24, but remains in contact with it to energize solenoid 30 on the opposite side to cause gears 10 and 38 to mesh to bring the disk 25 back to its initial position.

At the back of disk 25 is affixed a pulley 47. One end of a cord 48 is attached to pulley 47 and passes around a pulley 49 and over a groove in a rotatable drum 50 to a weight 51 which is suspended under the action of gravity. Since the cord 48 is under constant tension from the weight 51, it places disk 25 and drum 50 in exact rotational relation with each other. Thus as disk 25 follows hand 18 in direct relation to the pressure in chamber 12, it draws drum 50 with it in exact rotational relation therewith through the medium of the cord 48. If a sheet of paper 52 be affixed to the drum, and a pencil 53 be affixed to the pencil carriage 75 with its point resting on the paper 52, a line will be drawn on the paper which in length circumferentially to the drum 50 will be in direct ratio to the pressure in the chamber 12.

As the pressure changes, more or less force is exerted on the piston 11 and thence transmitted through a movable frame 55 to a specimen 56, which is affixed at its ends to the frame 55 and to the stationary frame 57.

The application of force to the specimen 56 causes it to elongate in accordance with well-known physical laws. A sharp metallic point 58 fixed in frame 59 is forced into the specimen 56 and engaged therewith by means of a clamp 60. A sharp metallic point 61 fixed in block 62 is likewise forced into the specimen and engaged therewith by the clamp 60. The block 62 and frame 59 are rotatably engaged by means of trunnions 63. To block 62 is affixed an arm 64 which carries at its outer end an insulated electrical contact point 65. At the upper end of the frame 59 is mounted a micrometer screw head 66 in an insulating bushing 67, and carrying on its rotatable sleeve a fixed pulley 68. At the inner end of the head 66 is mounted a second electrical contact point 69 axially in line with the contact 65.

A weight 70 is attached to a cord 71 to maintain the cord at constant tension over the pulley 68 and around pulleys 72, 73 and 74. The end of the cord 71 is attached to a pencil carriage 75 which is movable longitudinally upon rod 54.

From contacts 65 and 69 insulated wires lead to a battery 76 and a relay 77, which, when energized, opens a contact 78 assuming that a manually operable switch 78' is closed. Contact 78 when closed is in series with a battery 79, solenoid 80 and switch 78'. The armature of solenoid 80 is affixed to a lever 81 of a yoke 82 which is rotatable about a center 83. Carried in bearings 84 and 85 is a shaft 86 to the ends of which are affixed bevel gears 87 and 88. Shaft 86 carries a spiral gear 89 meshing with a spiral gear 90 whose shaft has a worm 91 for driving a worm gear 92. The shaft of worm gear 92 carries pulley 93.

Arm 81 is provided with a lateral projection serving as a core for a solenoid 80' in the same manner as solenoid 80. Energization of solenoid 80' swings yoke 82 in a counterclockwise direction to cause engagement between bevel gears 9 and 88. Solenoid 80' is connected to one side of battery 79 and to the other side thereof through a manually operable switch 78" and a contact 78a adapted to be closed upon energization of relay 77. Gears 9 and 88 or gears 9 and 87 may be thrown out of mesh merely by coaction between the teeth upon deenergization of solenoids 80 and 80' although if desired arm 81 and the gear yoke 82 may be yieldably held in their neutral position by a pair of opposed springs 81' and 81".

An endless cord 94 passes around the pulley 93, and also around pulleys 95, 96, 97, 98, 99 and 100 to pencil carriage 75, to which it is affixed so that if the cord moves the pencil carriage moves with it by sliding on rod 54, about which rod the pencil rotates so the point of pencil 53 may rest on paper 52.

The operation of this portion of the apparatus is as follows: Assuming switch 78' to be closed and switch 78" to be open, then as pressure in the chamber 12 increases, piston 11 moves upward increasing the separation between frames 55 and 57 and applying force to the specimen 56 which elongates, a portion of the elongation taking place between the points 58 and 61. The result of this elongation is to rotate the block 62 and arm 64 counterclockwise in trunnions 63 and thus separate contacts 65 and 69. As the electrical circuit is thus broken, relay 77 is deenergized permitting contact 78 to close and energize solenoid 80 from battery 79. The armature of solenoid 80 is thus drawn in, rotating yoke 82 clockwise through lever 81 around the axis of shaft 83 and engaging gears 9 and 87 which, through the medium of spiral gears 89 and 90 and worm 91 and worm gear 92, causes pulley 93 to rotate and move the pencil carriage 75 through the medium of cord 94. As the pencil carriage 75 moves, it carries with it the cord 71 which rotates the pulley 68 and causes the micrometer screw head 66 to advance and close contacts 65 and 69. As this occurs, relay 77 is energized, opening contact 78 and releasing solenoid 80 which permits gears 9 and 87 to become disengaged, thus stopping the pencil carriage 75.

Thus as the elongation between points 58 and 61 proceeds, the contacts 65 and 69 are alternately separated and closed and the pencil carriage 75 is moved in steps in a direction parallel to the axis of the drum by an amount which bears a direct relation to the elongation in specimen 56 in the portion between points 58 and 61. The pressure change in chamber 12 which acts to produce this elongation is communicated to drum 50 in the manner described heretofore, causing drum 50 to rotate proportionally, thus combining the two motions to draw a single line 101, the coordinates of which circumferentially to the drum are proportional to the pressure, and longitudinally are proportional to the elongation in specimen 56 between the points 58 and 61.

By proper mechanical refinements, the steps in both directions are reduced to such small amounts for each period of operation of the device that the resultant appears to be a smooth curve. The smoothness of operation is greatly enhanced by arranging the circuits and mechanism so the power from the motor 1 tends to raise the weights 51 and 70 against the action of gravity with increasing pressure in chamber 12 and increasing elongation in specimen 56.

The foregoing operation has reference to increases in strain which are usually accompanied by an increase in load. If it is desired to produce a record of the strain characteristics while decreasing the load, then switch 78' is opened and switch 78'' closed in which event contraction of the specimen between points 58 and 61 will cause contacts 65 and 69 to close, thereby energizing solenoid 77 and closing contacts 78a, whereupon current from battery 79 will energize solenoid 80' and thus engage bevel gears 9 and 88. Cord 94 will immediately be driven in a reverse direction so as to move pencil carriage 75 in such manner as to indicate a decrease in strain. Upon movement of carriage 75, cord 71 will be reversely actuated thereby reversely rotating micrometer screw 66 and thus open contacts 65 and 69. Solenoid 77 will thereupon be deenergized to open contacts 78a, resulting in deenergization of solenoid 80' and return of block 82 to its neutral position with disengagement of bevel gears 9 and 88. However, in practical operation, the opening of contacts 65 and 69 is accompanied by a still further contraction in the deformation of the specimen, thus causing contacts 65 and 69 to close and thus repeating the operation just described. The length of time that gears 9 and 88 remain in mesh will of course depend upon the rate at which the strain of the specimen decreases. The motor 1 and shaft 2 are of course rotated at a speed in excess of that required for the largest possible rate of change of strain of a specimen. Hence it is seen that engagement of gears 9 and 88 is only an intermittent operation.

In running a test for strain during loading, switch 78' is closed and switch 78'' opened, thereby producing a curve as indicated at 100 in Fig. 3—"A." If it is desired to record strain characteristics upon unloading or decreases in strain, then when the curve approaches the knee 100', the operator closes switch 78'' and opens switch 78', thereby producing the reduced strain curve 101. It will be noted that in each case the width of the lines is determined by the increments of movement of carriage 75, which movements will be proportional to the fineness of the teeth between the bevel gears 9 and 88 or 9 and 87. This produces a line or band that is relatively narrow, thus permitting accurate interpretations of the strain characteristics on the chart. However, should it be desired to avoid manual manipulation of switches 78' and 78'' at the critical point near the knee 102 of the curve, Fig. 3—"B," the operator may close both of said switches at a point just before the knee is reached. The result of this operation is that solenoids 80 and 80' are alternately electrically energized to give opposite electrical effects with the result that pencil carriage 75 is given a slight reciprocating action of twice the magnitude that it would have with only one solenoid 80 or 80' adapted to be energized. This operation, however, has the advantage that the complete knee of the curve is attained automatically without guesswork on the part of the operator. When the operator observes that the knee of the curve has been passed he may then disconnect switch 78' and thereby obtain a substantially fine line graph of the reducing strain characteristics of the specimen. If desired, the operator can close both switches 78' and 78'' throughout the complete up and down range of the curves, although this would involve sacrifice in accurately interpreting the curves such as is shown at 103, Fig. 3—"C."

For a complete understanding of the invention, I have disclosed a preferred modification thereof. It is to be understood, however, that variations and equivalents are contemplated such as will be embraced within the scope of the claims which follow.

I claim:

1. Apparatus for recording physical characteristics of a test specimen stressed in a materials testing machine comprising, in combination, a chart and marker, continuously rotating power operated means, and mechanism adapted to be operated thereby for effecting reversible relative movement between the chart and marker in accordance with increases and decreases in strain including control means responsive only to increases of strain and control means responsive only to decreases in strain.

2. Apparatus for recording physical characteristics of a test specimen stressed in a materials testing machine comprising, in combination, a chart and marker, continuously rotating power operated means, mechanism adapted to be operated thereby for effecting reversible relative movement between said marker and chart in accordance with increases and decreases in strain, and means for controlling said mechanism so that it is selectively responsive either to only increases or only decreases in strain or to both.

3. Apparatus for recording physical characteristics of a test specimen stressed in a materials testing machine comprising, in combination, a chart and marker, continuously rotating power operated means, and mechanism adapted to be operated thereby for effecting reversible relative movement between said marker and chart in accordance with increases and decreases in strain including electric means responsive to increases in strain and other electric means responsive to decreases in strain of the specimen.

4. Apparatus for recording physical characteristics of a test specimen stressed in a materials testing machine comprising, in combination, a chart and marker, continuously rotating power operated means, and mechanism adapted to be operated thereby for effecting reversible relative movement between said marker and chart in accordance with increases and decreases in strain including electric means responsive to increases in strain and other electric means operating in opposed relation to said first electric means and responsive to decreases in strain of the specimen.

5. Apparatus for recording physical characteristics of a test specimen stressed in a materials testing machine comprising, in combination, a chart and marker, continuously rotating power operated means, and mechanism adapted to be operated by said power means for effecting relative movement between said marker and chart in accordance with strain variations including control means having electrical effects in opposed relation to each other and responsive to strain variations; said control means having a pair of solenoids and means common to each of said solenoids for effective alternative energization thereof.

6. Apparatus for recording physical characteristics of a test specimen stressed in a materials testing machine comprising, in combination, a chart and marker, continuously rotating power operated means, and mechanism adapted to be operated by said power means for effecting relative movement between said marker and chart in accordance with strain variations including control means having electrical effects in opposed relation to each other and responsive to strain variations; said control means having a pair of solenoids and an armature therefor, means common to each of said solenoids for effecting alternative energization thereof, and means for restoring the armature of said solenoids to a neutral position upon deenergization thereof.

ORVILLE S. PETERS.